United States Patent
Bagherzadeh et al.

(10) Patent No.: US 10,586,420 B1
(45) Date of Patent: *Mar. 10, 2020

(54) PHYSIOLOGICALLY CONTROLLED CASINO GAME

(71) Applicant: Neuromash Technologies LTD, Vancouver (CA)

(72) Inventors: Mehran Bagherzadeh, Vancouver (CA); Rodney LeRoy, San Jose, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 15/689,486

(22) Filed: Aug. 29, 2017

Related U.S. Application Data

(63) Continuation of application No. 15/673,397, filed on Aug. 9, 2017, now abandoned, which is a continuation-in-part of application No. 15/455,067, filed on Mar. 9, 2017, now Pat. No. 9,858,745, which is a continuation of application No. 15/226,624, filed on Aug. 2, 2016, now Pat. No. 9,779,575, which is a continuation of application No. 13/898,946, filed on May 21, 2013, now Pat. No. 9,412,233.

(60) Provisional application No. 61/618,901, filed on May 21, 2012.

(51) Int. Cl.
| | |
|---|---|
| *A63F 9/24* | (2006.01) |
| *A63F 13/00* | (2014.01) |
| *G06F 17/00* | (2019.01) |
| *G06F 19/00* | (2018.01) |
| *G07F 17/32* | (2006.01) |
| *G07F 17/34* | (2006.01) |

(52) U.S. Cl.
CPC ...... *G07F 17/3206* (2013.01); *G07F 17/3209* (2013.01); *G07F 17/3211* (2013.01); *G07F 17/3262* (2013.01); *G07F 17/3276* (2013.01); *G07F 17/3293* (2013.01); *G07F 17/34* (2013.01)

(58) Field of Classification Search
CPC ...... G06F 3/015; G06F 3/011; G07F 17/3209; G07F 17/3206
See application file for complete search history.

(56) References Cited

U.S. PATENT DOCUMENTS

| | | | | |
|---|---|---|---|---|
| 5,474,082 | A | * 12/1995 | Junker | A61B 5/0482 128/905 |
| 8,342,927 | B2 | 1/2013 | Englman | |
| 2010/0137047 | A1* | 6/2010 | Englman | G07F 17/32 463/6 |

\* cited by examiner

*Primary Examiner* — Milap Shah
*Assistant Examiner* — Jason Pinheiro
(74) *Attorney, Agent, or Firm* — Law Office of Rodney LeRoy

(57) ABSTRACT

A computerized method for an electronic game includes starting a round of play of the electronic game, and during the round of play monitoring a physiological attribute of a user's body. The method includes determining whether a value of the physical attribute exceeds a threshold level, and changing a chance of winning the round of play if the value of the physical attribute exceeds the threshold level. Changing a chance of winning the round of play may include increasing the chance of winning the round of play from a first chance to a higher second chance, where the round of play is for a game of chance.

20 Claims, 9 Drawing Sheets

PHYSIOLOGICALLY CONTROLLED CASINO GAME

CROSS-REFERENCE TO RELATED APPLICATIONS

This application claims the priority of U.S. patent application Ser. No. 15/673,397, filed Aug. 9, 2017, which is a continuation-in-part application of U.S. patent application Ser. No. 15/455,067, filed May 5, 2017, which claims the priority of U.S. patent application Ser. No. 15/226,624, filed Aug. 2, 2016, which claims the priority of U.S. patent application Ser. No. 13/898,946, filed May 21, 2013, which claims the benefit of U.S. Provisional Patent Application No. 61/618,901, filed May 21, 2012, which are incorporated by reference along with all other references cited therein and herein.

BACKGROUND OF THE INVENTION

The present invention generally relates to electronic games and electronic gaming systems. More particularly, the present invention relates to process management of an electronic game by monitoring of brain functions and utilization of brain signal.

Electronic gaming involves human interaction with a user interface of an electronic system so that the electronic system will generate feedback for user play of an electronic game that is played by the electronic system. Electronic systems that are configured for electronic game play are often referred to as game platforms or game systems. Examples of game systems include computers and video game consoles. These game systems range from large mainframe computers to small handheld devices.

Game systems include a combination of electronic components, which, in conjunction with low-level software, allow electronic games to operate on the game systems. The electronic components of a game system may be integrated into a single device, such as a small handheld device, or may include distributed components. For example, a personal computer that is configured to operate as a game system may be configured to connect one or more game controllers for controlling game play and to a separate video monitor that displays a graphical user interface for a electronic game. A console game system might similarly be configured to be connected to separate game controllers and a video monitor, such as a television. A handheld gaming device, in contrast, may be a self-contained electronic device that includes an integrated display and integrated game controller for game play.

Game controllers that are often used for controlling electronic games include a variety of device types, such as computer mice, keyboards, joysticks, touch screens, steering wheels, or the like. For example, personal computer games that operate on personal computers often require the use of a keyboard or joystick for game play, or may require the substantially simultaneous use of a keyboard and computer mouse for game play. These game controllers are configured to receive tactile input from a user for controlling an electronic game. However, tactile input for game control is limiting and often drives the types of games that can be developed for game systems. Therefore, game developers that have a desire to develop new games also often have a desire to develop new types of game controllers.

BRIEF SUMMARY OF THE INVENTION

Embodiments of the present invention are generally related to electronic games and electronic game systems, and more specifically provide for interactive electronic gaming through monitoring physiological parameters of a user body, monitoring the user's conscience state of the user's brain, or both. A chance of winning a round of play of the game can be increased based on the physiological parameter, conscience state, or both. The increased chance of winning the game keeps the user engaged in the game so that the user will play the game for a long period of time. The game can be a game a chance, such as a casino game, in which the increased chance of winning provides a greater return on a bet than the chance of winning prior to being increased.

In an implementation, a system includes an electronic game machine that is adapted to play the game of chance or other electronic games, such as sports games. The electronic game machine includes a processor capable of electrically coupling to a physiological parameter monitoring device and a computer-readable storage medium that is connected to the processor.

The storage medium stores instructions for controlling the processor to be capable of: starting a round of play of a game operated by the electronic game machine, receiving electrical signals for a physiological parameter transmitted from the physiological parameter monitoring device to the electronic game machine during a temporal period when the round of play of the game is being played by the electronic game machine; calculating a value of the physiological parameter using the electrical signals received from the physiological parameter monitoring device during the temporal period when the round of play is being played by the electronic game machine; and changing a chance of winning the round of play being played from a first chance of winning to a second chance of winning, during the temporal period when the round of play is being played by the electronic game machine, if the value of the physiological parameter detected by the physiological parameter monitoring device is greater than a threshold level of the physiological parameter.

The threshold level of the physiological parameter is previously determined and information for the threshold level of the physiological parameter is stored in the computer-readable storage medium. The second chance of winning is different from the first chance of winning.

The physiological parameter monitoring device may be a smartwatch, a virtual reality headset, an augmented reality headset, a fitness tracker, a pedometer, a piece of exercise equipment, or other monitoring device.

The following detailed description and accompanying drawings provide a better understanding of the nature and advantages of the present invention.

DETAILED DESCRIPTION OF THE INVENTION

Embodiments of the present invention provide a method, a game system, and a computer program product for electronic gaming and process management for an electronic game by monitoring and utilizing brain actively for game control.

Brain Activity

Brain activity of humans can be monitored to identify recognizable states of consciousness. More specifically, brain activity can be monitored via the detection of relatively low frequency electrical waves that occur in the brain. A variety of devices are configured to detect these low frequency electrical waves, such as electroencephalography (EEG) machines and magnetoencephalography (MEG) machines.

Alpha waves, for example, are one type of brain wave (e.g., out of five brain waves) that can be detected by EEG and MEG machines. Alpha waves are indicators of a state of relaxation of a person who is awake. Alpha waves have an oscillation frequency of about 8-12 hertz and predominantly originate from the occipital lobe during wakeful relaxation. An alpha-like variant wave called the mu wave can also be detected by EEG and MEG machines. Mu waves have an oscillation frequency of about 8-13 hertz and are found over the motor cortex and are associated with movement. Specifically, mu waves are associated with changes in movement, such as movement reduction, and with the intention to move.

EEG and MEG machines may also detect other brain waves, such as beta waves that propagate in the brain at about 12 and 30 Hz. Beta waves are reflective of the states associated with normal waking consciousness, such as active, busy, or anxious thinking and active concentration. Beta waves are further associated with the muscle contractions that happen in isotonic movements and are suppressed prior to and during movement changes. The intensity of beta waves may increase when movement has to be resisted or voluntarily suppressed. Beta waves also propagate over the motor cortex.

Embodiments of a game system descried in this patent are configured to detect such brain activity (e.g., alpha, beta, and mu waves) and utilize the detected brain activity to control an electronic game, such as a casino style electronic game that is configured to operate on a game system. For example, embodiments of the game system described in this patent are configured to detect one or more brain waves, such as all of the brain waves, such as the alpha waves, the beta waves, the delta wave, the mu waves, and the theta waves. Game systems of the present invention may also analyze (e.g., apply one or more mathematical functions to) one or more detected brain wave individually or cumulatively to provide one or more summaries of brain activity (e.g., sometimes referred to as a state of the brain).

Game System

Figure 1:
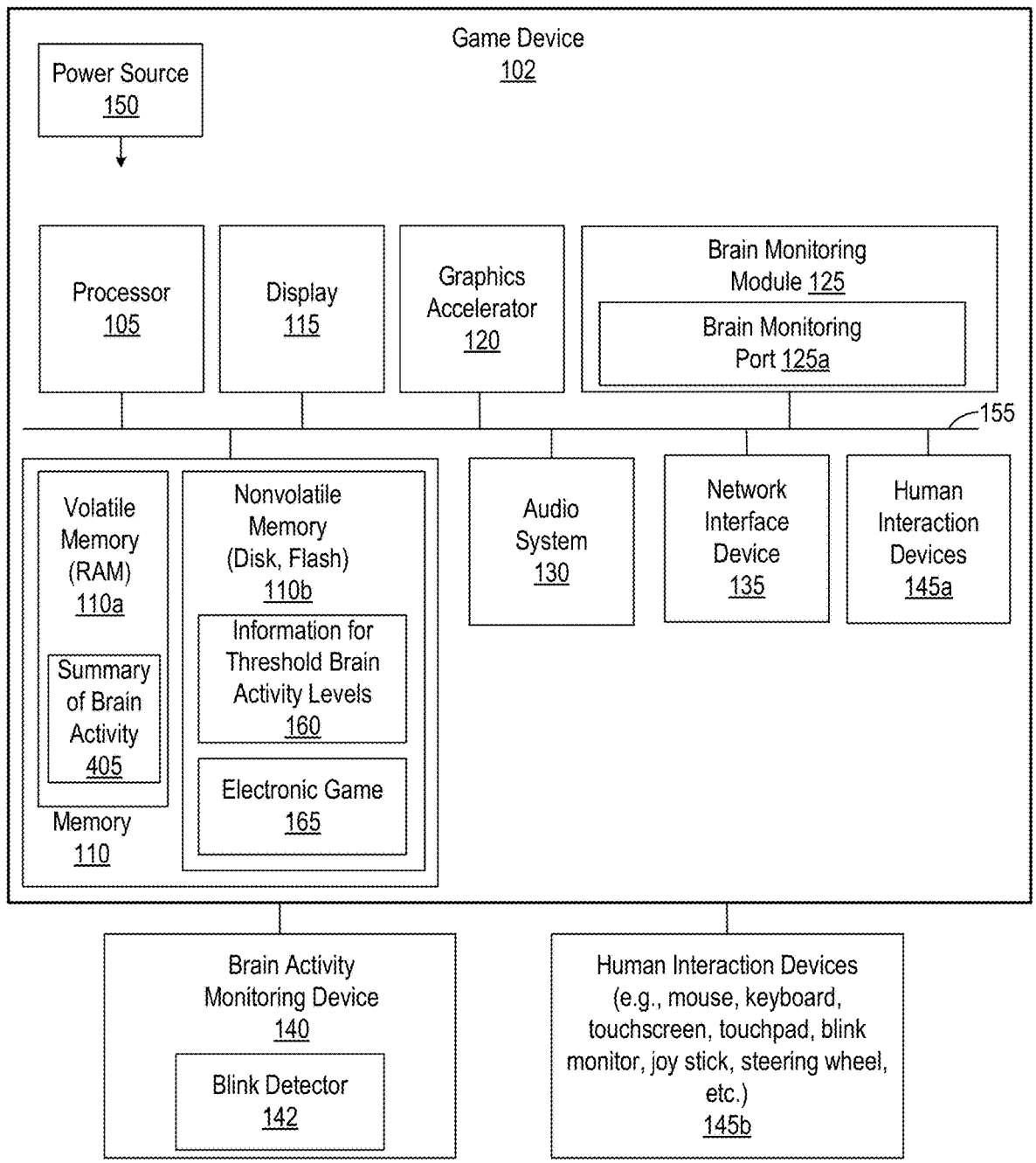
FIG. 1 is a simplified schematic of a game system according to one embodiment.

FIG. 1 is a simplified schematic of a game system 100 according to one embodiment. Game system 100 may include one or more of a variety of game devices 102 on which an electronic game can be played, such as a computer (e.g., a desktop computer, a laptop computer, a tablet computer, or the like), a gaming console, or a mobile device (such as a mobile device dedicated to game play or configured to perform additional functions, such as smartphone functions). This list of game devices is not exclusive and embodiments of the present invention may include other game devices.

Game device 102 may also include a processor 105, a memory 110, a display 115, a graphics accelerator 120, a brain monitoring module 125 having a port 125a for external communication, an audio system 130, a network interface device 135, a set of human interface devices 145a, and a power source 150. A set as referred to herein includes one or more elements. For example, the set of human interface devices 145a may include one or more human interface devices. Different implementations of gaming device 100 may include any number of the listed components, in any combination or configuration, and may also include other components not shown.

The foregoing listed components of game device 102 may be linked together via a bus 155, which may be the system bus architecture of gaming device 102. Although this figure shows one bus that connects the components, the busing is illustrative of any interconnection scheme serving to link these components or other components included in gaming device's 102 subsystems. For example, the audio system 130 could be connected to a subsystem through a port or have an internal direct connection to processor 105.

Game device 102 may be an integrated system where the listed components are housed substantially in a single housing, or may be a modular system. For example, while display 115 is shown in FIG. 1 as being included in game device 102, the display might be an external device, such as a stand-alone computer monitor, television device, a display of a phone (e.g., smartphone), a display of a watch (e.g., smartwatch), a display of a piece of exercise equipment (e.g., a treadmill, an exercise bike, a stepmill machine, a stair climber machine, a rowing machine, an elliptical trainer machine, on a piece of clothing, or others), a display of a fitness monitor (e.g., a fitness monitor adapted for wear on the wrist similar to a watch, on the ankle, on the ears, or others), such as a Fitbit fitness monitor, a display of a physiological monitor device that connects to a user body or clothing and monitors one or more physiological parameters of the user, such as heart rate, change in heart rate, respiration rate, change in respiration rate, perspiration secretion, oxygen saturation (e.g., relative oxygen saturation or absolute oxygen saturation), or others.

According to another example, while game system 100 is shown as including human interface devices 145a integrated with game device 102, the human interface devices might be external devices (e.g., human interface devices 145b), or might be a combination of integrated and external human interface devices. External human interface devices 145b may be configured to wire or wirelessly connect to game device 102.

Processor 105 may include a microprocessor, a microcontroller, control logic (e.g., field programmable gate array ("FPGA"), programmable logic device ("PLD"), complex programmable logic device ("CPLD"), or other), a multicore processor, an application specific integrated circuit ("ASIC") or the like. Memory 110 may include a variety of memories, such as a volatile memory 110a (e.g., a RAM), a non-volatile memory 110b (e.g., a disk, Flash, PROM, etc.). Nonvolatile memories are sometimes referred to as nontransitory memories. One or more nontransitory memories of game device 102 may store computer code for an electronic game 165, such as an electronic casino game. Power source 150 can be an AC source, a battery, such as a disposable battery, or both. Different implementations of game device 102 may include any number of the listed components, in any combination or configuration, and may also include other components not shown.

The sets of human interface devices 145a and 145b may include one or more of a variety of devices. For example, the sets of human interface devices 145a and 145b may include a computer mouse, a keyboard, a touchpad, a blink monitor for monitoring whether a user's eye has blinked, a joystick, a steering wheel, a phone (e.g., smartphone), a watch (e.g., smartwatch), a piece of exercise equipment (e.g., treadmill, exercise bike, a stepmill machine, a stair climber machine, a rowing machine, an elliptical trainer machine, on a piece of clothing, or others), a fitness monitoring device (e.g., a fitness monitor adapted for wear on the wrist similar to a watch, on the ankle, on the ears, or others), such as a Fitbit fitness monitor, a physiological monitoring device that connects to a user body or clothing and monitors one or more physiological parameters of the user, such as heart rate, change in heart rate, respiration rate, change in respiration rate, perspiration secretion, or others. A fitness monitoring device can be a smartphone adapted to monitor one or more physiological parameters of a user, a smartwatch adapted to monitor one or more physiological parameters of a user, headphones adapted to monitor one or more physiological parameters of a user, earphones adapted to monitor one or more physiological parameters of a user, or other user wearable device. If display 115 is a touch screen, then the display may operate as one of the human interface devices as is common with mobile game devices.

Network interface device 135 may include one or more of a variety of wired or wireless interfaces configured to communicate via a variety of communication protocols with external devices and external networks, such as the Internet, intranets, home networks, personal networks, or the like.

Brain Activity Monitoring

Game device 102 may include, or may be configured to connect (wire or wirelessly) to, a brain activity monitoring device 140 of game system 100. Brain activity monitoring device 140 is configured to monitor the brain activity of a user of game device 100. Specifically, brain activity monitoring device 140 may be configured to monitor a user's brain activity, such as a user's alpha waves, beta waves, mu waves, or the like.

Brain activity monitoring device 140 may be configured to generate and output a "brain" signal (analog or digital) that includes information for the user's brain activity. The brain signal may include: i) unprocessed (i.e., raw) information for the user's brain activity detected by one or more detectors (e.g., electrodes), which are included in brain activity monitoring device 140, ii) processed information of the user's brain activity, or iii) a combination of unprocessed and processed information. The unprocessed information may include information for the user's brain waves. For example, the unprocessed information may include information for a variety of brain waves, such as information for the intensity of the user's alpha waves, beta waves, delta waves, gamma wave, mu waves, theta waves, and the like.

Brain activity monitoring device 140 may be configured to process the unprocessed information collected from a user's brain according to one or more algorithms that are configured to provide an interpretation of a user's brain waves. The processed information may include information regarding general brain states, such as indexed information for levels of brain relaxation, brain focus, brain familiarity, brain anxiety, or the like.

Brain monitoring port 125a may be configured to receive the brain signal from brain activity monitoring device 140, and transfer the brain signal to brain monitoring module 125. Brain monitoring module 125 may be configured to analyze the brain signal and utilize the brain signals to control various aspects of electronic casino game 165, which may be operating on game device 102. According to one implementation, brain monitoring module 125 is configured to compare the received brain signal and to one or more threshold brain activity levels 160 for controlling the electronic casino game. Control of the electronic casino game via the utilization of brain signals is described in further detail below. Information for the threshold brain activity levels 160 may be stored in memory 110 and retrieved by brain monitoring module 125 for controlling the electronic casino game Brain activity monitoring device 140 may be the MindSet™, the MindWave™, or the MindWave Mobile™ brain activity-monitoring device of NeuroSky, Inc. of San Jose, Calif.; the Muse™ brain activity-monitoring device of Interaxon, Inc. of Toronto Ontario; or the EPOC™ of Emotiv, Inc. of San Francisco, Calif. The foregoing list of brain activity monitoring devices is not inclusive and other brain activity monitoring devices may be used with embodiments of the present invention.

Electronic Casino Games

In one implementation, electronic casino game 165 includes one or more game attributes that can be controlled by a user controlling and changing her brain activity, such as controlling and changing the intensity of her brain waves. As described above, brain activity monitoring device 140 may detect the user's brain activity (e.g., alpha wave intensity) as the user controls and changes her brain activity, and may generate the brain signal based on the detection of the user brain activity. The brain activity-monitoring device may transmit the brain signal to the electronic casino game where the electronic casino game uses the brain signal for controlling one or more game attributes.

Electronic casino game 165 may substantially continuously monitor the received brain signal and change one or more game attributes of the electronic game based on the brain signal, such as based on changes in the brain signal. For example, the electronic casino game may be configured to monitor a portion or all (unprocessed or processed) of the brain signal associated with the user's brain waves (such as five, six, seven, eight, or more of the user's brain waves) and change one or more game attributes as the intensity of the user's say alpha waves (relative to the other four or five waves) increase or decrease as indicated by the brain signal. The user might increase the intensity of her alpha waves (or any combination of her other brain waves), for example, by controlling and increasing a sense of relaxation of her mind, body, or both.

According to another example, the electronic game may be configured to monitor a portion (unprocessed or processed) of the brain signal associated with the user's beta waves and change a game attribute as the intensity of the user's beta waves increase or decrease as indicated by the brain signal. The user might increase the intensity of her beta waves (or any combination of her other waves), for example, by controlling and increasing a sense of active concentration.

According to another example, the electronic casino game might monitor a portion of the brain signal that indicates the user's familiarity with a task (i.e., task familiarity), the difficulty a user experiences in performing a task, the user's state of alertness, or the like. The foregoing description provides specific examples of information included in the brain signal that may be monitored and utilized by the electronic casino game for controlling game attributes. However, the foregoing description does not limit the information included in the brain signal, and does not limit the information in the brain signal that the electronic casino game may monitor and utilize for game control. The electronic casino game may monitor information in the brain signal related to brain activity, such as alpha waves, beta waves, delta waves, gamma waves, mu waves, theta waves, or the like. It is noted that while a number of different types of brain waves are discussed herein, the brain activity monitoring device might monitor one or more (e.g., all) of these waves or other brain waves. It will be understood by those of skill in the art that brain waves are sometimes divided into other sets of frequencies and labels with other brain wave identifiers.

Game Attributes

A game attribute of the electronic casino game might be an attribute that the electronic casino game provides a user output for (e.g., via processor 105) on display 115, on audio system 130, on a human interface device 145*a* or 145*b* (e.g., that is configured to provide tactile feedback), or a combination of the foregoing components. As such, a user of the electronic casino game can visually, audibly, or tactilely perceive changing the game attribute as the user controls and changes her brain activity. That is, the user is provided feedback of her brain activity (sometimes referred to as neurofeedback) and whether she is changing her brain activity based on the user output from the electronic casino game.

According to one implementation, the electronic casino game is configured to provide a game reward if the user controls (e.g., maintains or changes) her brain activity in a predetermined manner where the electronic casino game can determine whether the user's brain activity has changed, for example, in the predetermine manner by monitoring and analyzing the brain signal.

For example, the electronic casino game may provide a game reward if the user maintains the intensity of one or more of her brain waves within a given range or at a relatively constant level, such as substantially maintaining the intensity of her alpha waves while she plays the electronic casino game. Alternatively, the electronic casino game may provide a game reward if the user changes the intensity of one or more of her brain waves, such as increasing the intensity of her alpha waves by relaxing her mind, body, or both while she plays the electronic casino game. Game rewards are well understood in the art and specific example of game rewards are described below.

According to one embodiment, the electronic casino game is an electronic slot machine type of game, an electronic poker type of game, or the like. The slot machine game may provide a game reward if the user changes her brain wave intensities in a first manner (e.g., for alertness, for relaxation of her mind or body, or a combination thereof) as the user plays the slot machine game. For example, the slot machine game may provide the game reward if the user increases her brain wave intensities for alertness, for relaxation of her mind or body, or a combination thereof. The slot machine game may provide a game detriment if the user lowers her brain wave intensities for alertness, for relaxation of her mind or body, or a combination thereof.

According to one implementation, the game reward provided by the slot machine game may include slowing the "rotation" rate of the slot wheels that are displayed on display 115, and the game detriment may include increasing the rotation rate of the slot wheels. At the beginning of a round of play of the slot machine game, the rotation rate of the slot wheel may be a predetermined rate that can be raised or lowered based on the user's detected brain waves as described above. With the rotation rate of the slot wheels lowered, the slot machine game provides the user with an increased chance of stopping the slot wheels in a winning configuration and thereby provides an increased chance of winning the round of playing being played by the game machine. That is, with the rotation rate of the slot wheels lowered, the user can more easily determine whether game symbols that are currently showing on the rotating slot wheels should be stopped on, or not stopped on, to achieve a winning configuration of the game symbols. In contrast, with the rotation rate of the slot wheels increased, the user may not be able to easily determine whether the game symbols that are currently showing should be stopped on or not to achieve a winning configuration. In brief overview, if the user controls her brain waves to slow the rotation rate of the slot wheels, then sees that the rotation rate of the slot wheels is lowered and can see game symbols for a winning configuration, then the user may have an increased chance of winning a round of play of the slot machine game.

In the round of play of the slot machine game, the slot wheels may be stopped one or more at a time. The slot wheels may be stopped based on the detection of a user action. Brain activity monitoring device 140, one or more of the human interface devices 145*a* or 145*b*, or both may be configured to detect a user action for stopping the rotation of the slot wheels (e.g., one or more at a time). According to one specific embodiment, brain activity monitoring device 140 includes a blink detector 142 that is configured to detect the blinking of the user's eyes. Brain activity monitoring device 140 may transmit a control signal to brain monitoring port 125*a*, where the control signal includes blink information that indicates whether the user has blinked her eyes. Brain monitoring module 125 may use the control signal to determine whether the user has blinked her eyes and control the slot machine game to stop one or more of the slot wheels based on whether the user has blinked her eyes. After a round of the slot machine game has been played, another round of the slot machine game may be started via detection of a user input by brain activity monitoring device 140 (e.g., an eye blink), or by one or more of the human interface devices 145*a* or 145*b*.

Figure 2A:
FIG. 2A is a simplified image of a user interface for the above described slot machine game according to one embodiment.

FIG. 2A is a simplified image of a user interface for the above described slot machine game according to one embodiment. The user interface includes a number of slot wheels 167 (e.g., three shot wheels 167*a*, 167*b*, and 167*c*) that are configured to rotate on display 115. As described above, the rotation rate of the slot wheels may be increased or decreased based on the user's brain activity. According to one implementation, the user interface may also include an indicator 170 that indicates a level of the particular brain activity that the slot machine game is monitoring for use in changing the rotation rate of the slot wheels. The user interface may include a set of screen buttons or the like for controlling various aspects of the slot machine game, such as making bets, checking the user's balance, stopping rotation of the wheels, and the like.

According to one embedment, the electronic casino game may utilize a number of threshold levels (or ranges) for a user brain activity to determine whether to provide a game benefit (i.e., change a game attribute to increase the user's chances of winning a round of play), leave the game unchanged (i.e., not change the game attribute thereby leaving the user's chances of winning the round of play unchanged), or provide a game detriment (i.e., change the game attribute to decrease the user's chances of winning the round of play). For example, a first threshold level may be utilized for increasing the chances of winning a round of play, and a second threshold level (e.g., that is below the first threshold level) may be utilized for determining whether a game detriment will be provided. If the brain activity level is between the first and the second threshold levels, then neither a game benefit nor a game detriment may be provided.

According to one implementation, the electronic casino game utilizes the brain signal to substantially continuously change a game attribute. For example, if a portion of the brain signal is above a threshold level, and the brain signal changes substantially continuously as the user's brain activity changes, the electronic casino game may change the game attribute in a substantially continuous manner as the brain signal changes. For example, if the electronic casino game is the slot machine game, the rotation rate of the slot wheels may be substantially continuously and smoothly transitioned between rotation rates.

According to one implementation, the electronic casino game does not provide game detriments based on the user brain activity. For example, electronic casino games that have relatively low return percentages (i.e., percentage of bet made) for winning a round of play might not provide game detriments. For example, an electronic slot machine game that has a relatively low return percentage might not increase the rotation rate of the slot wheels if the user's brain activity falls below a threshold level for brain activity. In contract, an electronic slot machine game that has a relatively high return percentage might increase the rotation rate of the slot wheels if the user's brain activity falls below the threshold level for brain activity.

Figure 2B:
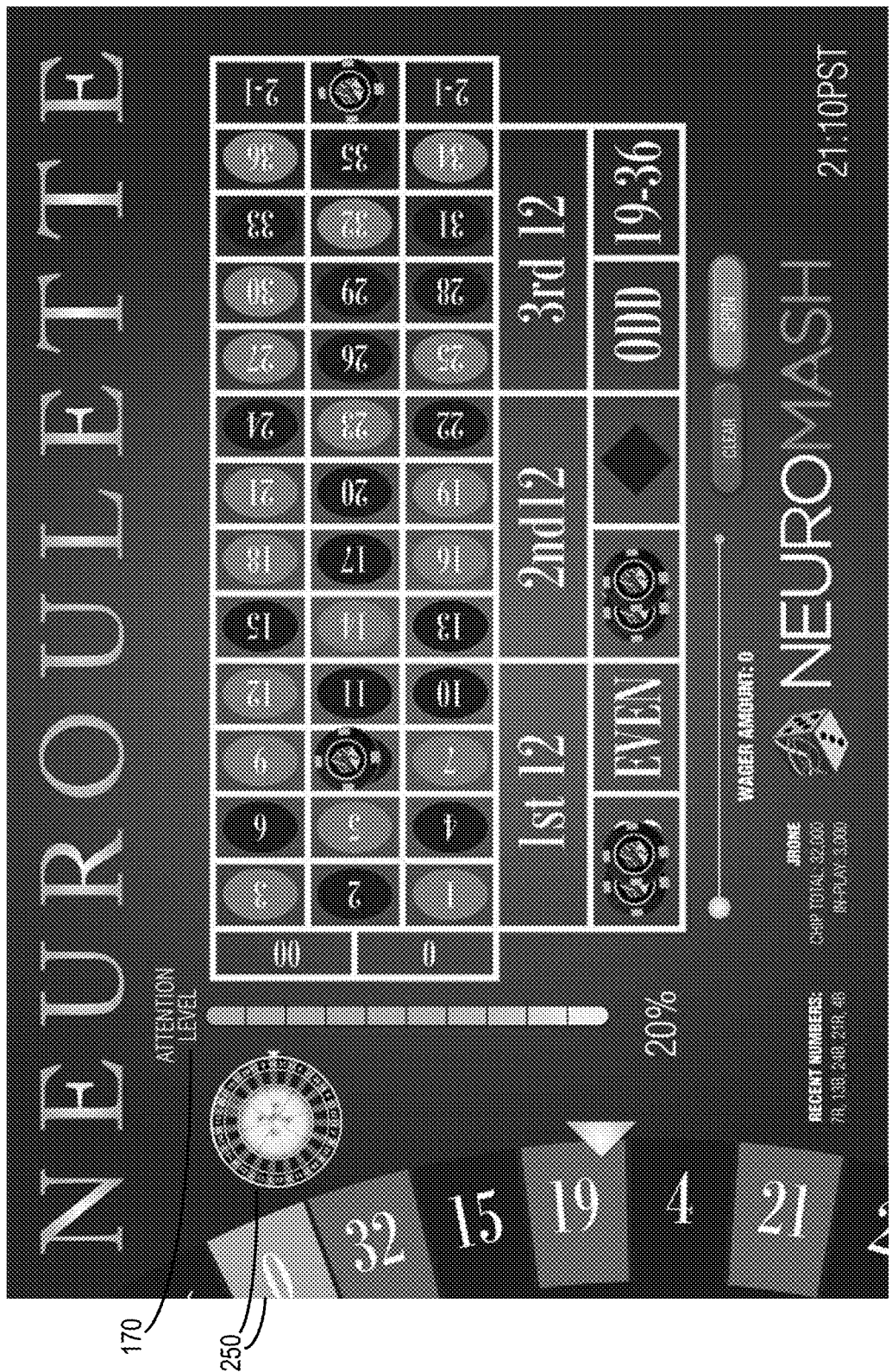
FIG. 2B is a simplified image of a user interface for a roulette game according to one embodiment.

While the example embodiments described above are directed to a slot machine game, embodiments of the present invention may include other electronic casino games that present information on a display or the like at a given rate, wherein the given rate may be changed to increase or decrease the chance of winning a round of play. For example, the electronic casino game may be an electronic roulette game where the rotation rate of the roulette wheel may be decreased as a game benefit to increase the chance of winning a round of play, or may be increased to decrease the chance of winning. FIG. 2B is a simplified image of a user interface for a roulette game according to one embodiment where a rotation rate of a roulette wheel 250 may be decreased to provide a game benefit or increased to provide a game detriment based on a user's brain activity as described above. The user interface for the roulette game may also include indicator 170 that indicates a level of the particular brain activity that the roulette game is monitoring for use in changing the rotation rate of the roulette wheel. The user interface may also include a set of screen buttons or the like for controlling various aspects of the roulette game, such as making bets, checking the user's balance, and the like.

Figure 2C:
FIG. 2C is a simplified image of a user interface for an electronic casino war game according to one embodiment.

Another embodiment of an electronic casino game in which information is presented to a user at a given rate is an electronic war game where cards that might be dealt to a user may be presented to a user a given rate, and the user can lower the given rate by controlling or changing her brain activity, or the given rate might be increased if the user is not successful in controlling or changing her brain activity in the manner expected by the electronic war game. FIG. 2C is a simplified image of a user interface for an electronic war game according to one embodiment where a presentation rate of cards 260 that might be dealt to a user may be increased to provide a game benefit or lowered to provide a game detriment based on a user's brain activity as described above.

Specifically, the electronic war game may display the faces of cards 260 that may be dealt to the user on display 115. Each card may be displayed for a relatively short period of time, such that at the rate at which the cards are displayed, the reaction time of the user may not be sufficient to guarantee that the user can select a specific card that the user would like dealt.

The electronic war game operating in conjunction with brain activity monitoring device 140 (as described above with respect to the slot machine game) may monitor the user's brain activity and provide a game option for increasing the length of times that the faces of the cards are displayed so that the user's chance of selecting the card being displayed increases. The length of time the face of a card is displayed may be increased by the user controlling and changing the user's brain activity as described above. For example, the electronic war game may require that the user increase her sense of relaxation by increasing the intensity of the user's alpha waves (or a combination of brain waves), and increase the amount of time the face of a card is displayed as the user's sense of relaxation increases. The electronic war game may allow the user to select a card displayed by a variety of method, such as those descried above with respect to the slot machine game (e.g., eye blink detection or the like).

The user interface for the electronic war game may also include indicator 170 that indicates a level of the particular brain activity that the electronic war game is monitoring for use in changing the presentation rate of cards 260. The user interface may also include a set of screen buttons or the like for controlling various aspects of the electronic war game, such as making bets, checking the user's balance, and the like.

Figure 2D:
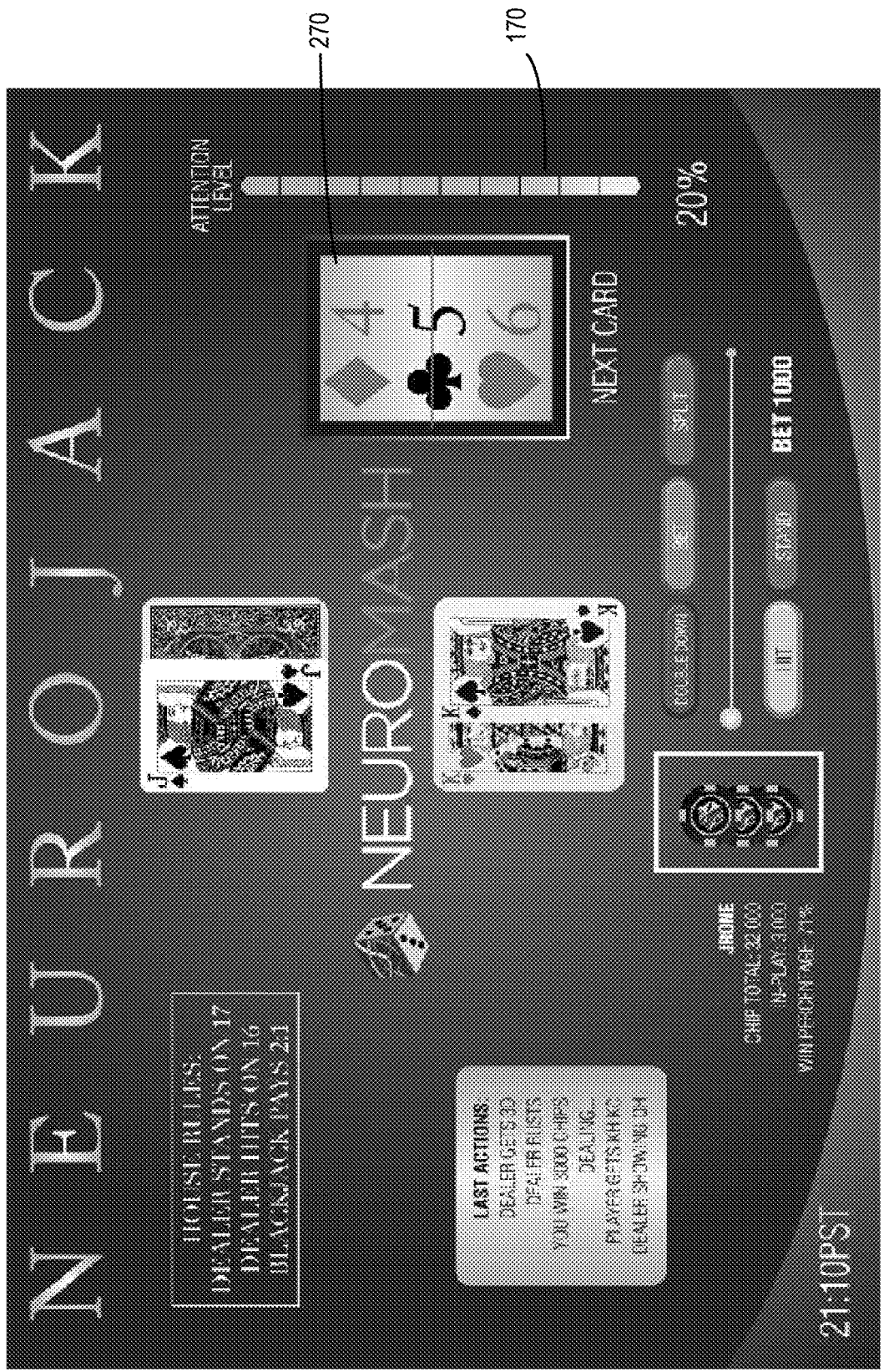
FIG. 2D is a simplified image of a user interface for a blackjack game according to one embodiment.

Another embodiment of an electronic casino game in which information is presented to a user at a given rate is an electronic blackjack game where cards that might be dealt to a user may be presented to a user a given rate, and the user can lower the given rate by controlling or changing her brain activity, or the given rate might be increased if the user is not successful in controlling or changing her brain activity in the manner expected by the electronic blackjack game. The control of the rate of cards being presented is substantially similar to the control of the rate of cards being presented as described above with respect to the electronic war game. FIG. 2D is a simplified image of a user interface for a blackjack game according to one embodiment where a presentation rate of cards 270 that might be dealt to a user may be increased to provide a game benefit or lowered to provide a game detriment based on a user's brain activity as described above.

The user interface for the electronic blackjack game may also include indicator 170 that indicates a level of the particular brain activity that the blackjack game is monitoring for use in presenting the cards. The user interface may also include a set of screen buttons or the like for controlling various aspects of the blackjack game, such as making bets, checking the user's balance, and the like.

Figure 3:
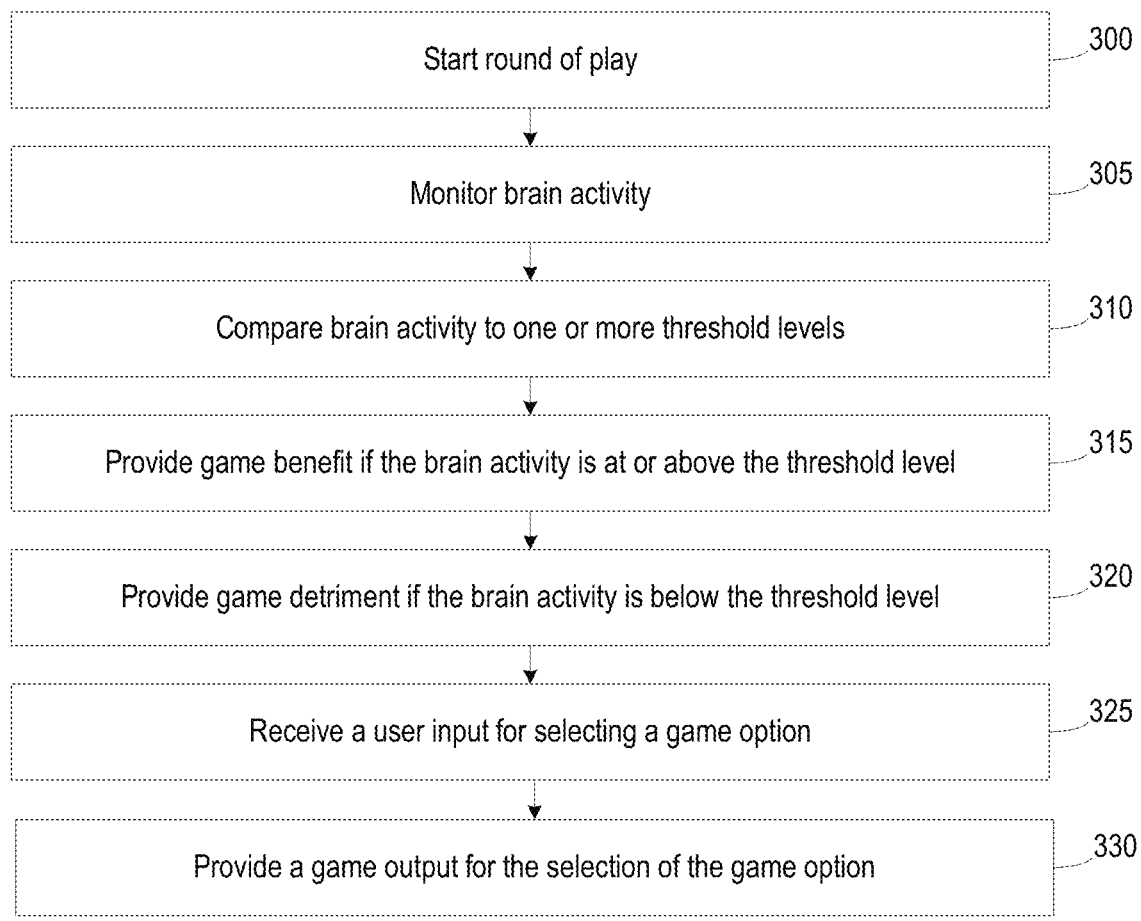
FIG. 3 is a high-level flow diagram of a method of play of a casino game according to one embodiment.

FIG. 3 is a high-level flow diagram of a method of play of a casino game according to one embodiment. The high-level flow diagram represents one example embodiment.

Steps may be added to, removed from, or combined in the high-level flow diagram without deviating from the scope of the embodiment.

At 300, a round of play of the electronic casino game is started, for example, via a user input received by game device 102. The user input may be received by the game device from brain activity monitoring device 140, by one of human interface devices 140a or 140b, or the like. At 305, brain activity monitoring device 140 monitors the user's brain activity and generates a brain signal based on the detected brain activity. At 310, the electronic casino game compares brain activity information in the brain signal to a threshold level of brain activity to determine whether the brain activity information is at or above the threshold level, or is below the threshold level. For a multiplayer game where multiple users are using the electronic casino game, the brain activity of multiple users may be compared to one or more threshold levels. At 315, the electronic casino game provides a game benefit if the brain activity information is at or above the threshold level. That is, the electronic casino game changes a game attribute to increase the user's chance of winning the round of play that is currently being played. The electronic casino game may provide a user output that indicates the change to the game attribute (i.e., decreasing the rotation rate of slot wheels where the rotation rate may be detected by the user) so that the user can monitor and control of the game attribute by controlling and changing her brain activity. At 320, the electronic casino game may provide a game detriment or leave the game unchanged if the electronic casino game determines that the brain activity information is below the threshold level. At 325, game device 102 receives a user input (e.g., a detected eye blink) from the user for selecting a game option based on the game attribute. The game option may be for stopping the round of play (e.g., stop all of the slot wheels) based on the game attribute (e.g., slowed slot wheels). Alternatively, the game option (e.g., stopping one slot wheel) might be included in a set of game options where other game options included in the set of game options may be selected by the user at a later time (e.g., stopping other rotating slot wheels at a later time). At 330, the electronic casino game provides a user output that indicates the user's selection of the game option (e.g., display the stopping or one or more of the slot wheels on display 115). Thereafter, if the round of the game is still being played (e.g., the other slot wheels are still rotating), then steps 305-330 may be repeated until the round of play has stopped (e.g., all slot wheel have been stopped from rotating).

According to one alternative embodiment, at step 310 where the electronic casino game is a multiplayer game and multiple users might be using the electronic casino game, then the brain activity of the multiple users may be monitored and may be compared to one or more threshold levels. Then at step 315, a game detriment might be applied if an opponent's brain activity is below the threshold level, and a game benefit might be applied if the opponent's brain activity is above the threshold level, alternative step 320. At 325, multiple game devices of the multiple users may receive user inputs from the respective users for selecting one or more game options based on various game attributes provided to the users.

Electronic Casino Game with Displayed Brain Signals

One implementation of an electronic casino game provides one or more user outputs for one or more pieces of information (e.g., for brain activity) that may be included in the brain signal. The information for the one or more brain activities may be provided via display 115, via audio system 130, or via tactile feedback from one or more of human interface devices 145a, 145b, or a combination thereof. The information can be used by a user to make decisions for playing the electronic casino game. For example, in a multiplayer electronic casino game where two or more users are playing the electronic casino game against one another, information for each user's brain activity might be displayed on each user's display 115. For a multiplayer electronic casino game, each user may use her own game device 102 to play the electronic casino game across a network (e.g., the Internet, intranet, or the like). Each user may use the displayed information to determine how to make plays in the electronic casino game based on their own brain activity and the other users' brain activity. For example, for an electronic poker game, one user might determine that a second user is experiencing brain activity for stress, and the user might make a game decision (e.g., increase a bet, decrease a bet, fold, or the like) based on the second user's stress.

Figure 4:
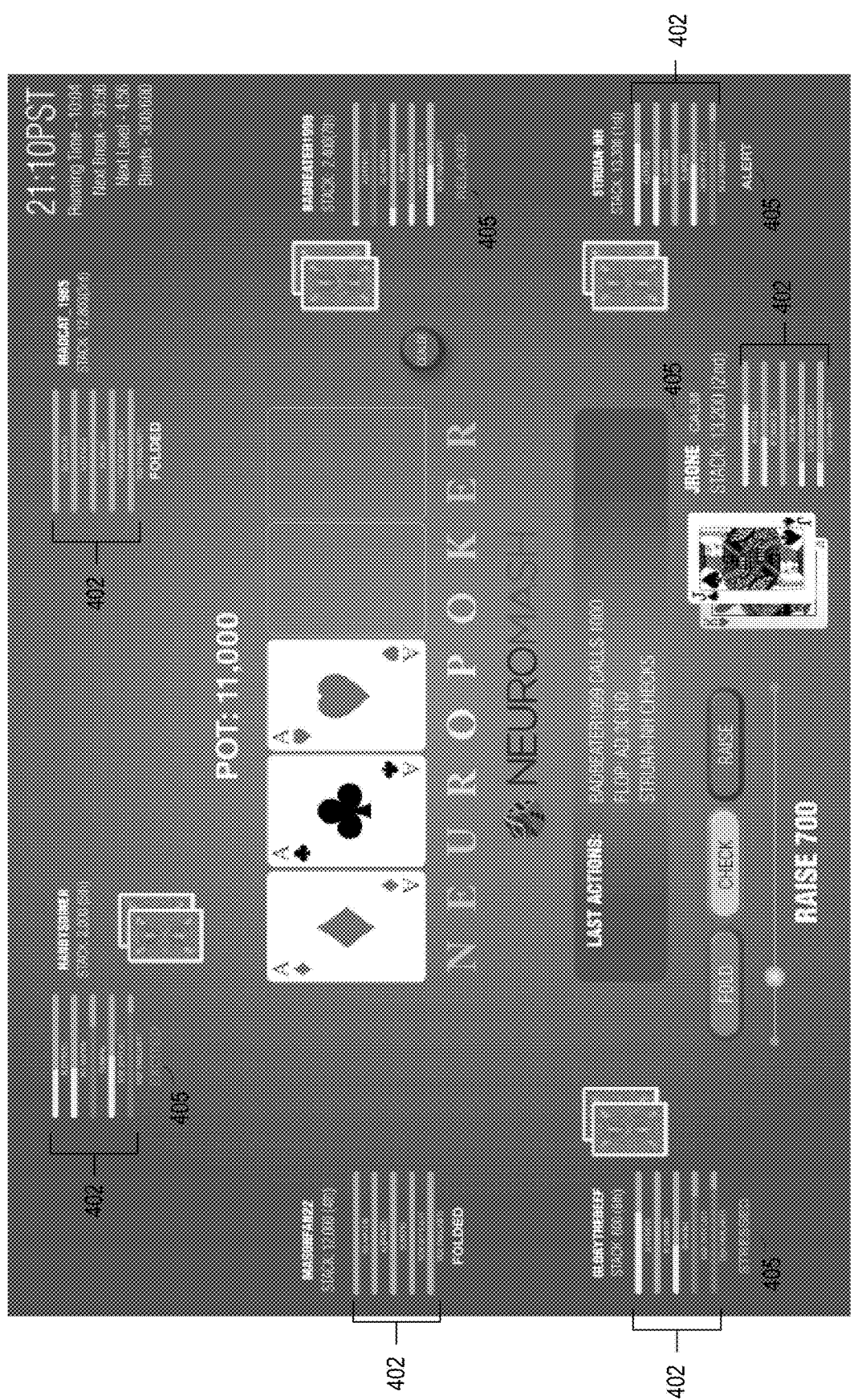
FIG. 4 is a simplified image of a user interface that may be displayed for an electronic poker game where the user interface is for one of the users playing the game and the user interface includes information of each user's brain activity.

FIG. 4 is a simplified image of a user interface that may be displayed for such an electronic poker game where the user interface is for one of the users playing the game and the user interface includes information 402 for each user's brain activity. The user interfaces of each of the other users playing the electronic poker game may be similarly configured to display the information for each user's brain activity. Each user's brain activity may be identified by a user identifier, such as a user name. The example user interface shown in FIG. 4 may be displayed for the user "JRONE" whose cards are shown facing up. Because each user can see information for every other user's brain activity, including the user's own brain activity, the brain activity of the other users might affect the brain activity of the user interpreting the other users' brain activity. Seeing other users' brain activity is a form of exposing the brain states and emotions of other users (i.e., "tells") based on each of the user's brain activity and can be used as a benefit or detriment in determining a next play to make in the electronic poker game.

The information for each user's brain activity may include one or more pieces of information. For example, the user interface may show information for: i) alertness, ii) relaxation, ii) task difficulty (i.e., information for the difficulty a user's brain is exhibiting while playing), vi) task familiarity (i.e., information for the familiarity a user's brain is exhibiting while playing), or other brain state information that may be included in the brain signal provided by brain activity monitoring device 140. It is noted that the foregoing list of brain states is not exclusive and that based on the advancements in brain study, new understanding of brain activity are yielding newer algorithms that can provide information for additional brain states based on detected brain waves. Embodiments of the present invention may use known and understood brain states or brain states known at the time. The information for a user's brain activity may be displayed in a variety formats, such as numerically, in one-dimensional bar graphs (e.g., as shown in FIG. 4), pie charts, or the like.

According to one implementation, brain activity monitoring device 140, game device 102, or both may be configured to generate a summary 405 (see FIG. 1) of a user's brain activity, such as a summary of the information for brain activity included in the brain signal. Methods for generating a summary of brain activity are well known to those of skill in the art, and are not described in details herein. The summary of a user's brain activity may indicate whether the user is feeling stress, calm, excited, or the like. The summary 405 of a user's brain activity may be displayed on the user interface (see FIG. 4), for example, of a multiplayer game, such as the electronic poker game described above. Users playing the electronic casino game may make decisions for making plays in the electronic casino game based on the summary of another user's brain activity or the user's own summary of brain activity. The information for each user's brain activity and the summaries of the brain activity may be displayed in a variety of electronic casino games where two or more users are playing an electronic casino game against one another.

As briefly described above, physical activity, such as eye blink activity of users, may also be monitored by the electronic poker game. Information for a user's physical activity (e.g., eye blink rate) may be displayed on the user interface of the electronic casino game, and may also be used for generating the summary information for each user's brain activity.

Electronic Casino Game Providing Brain Control and Displayed Brain Signals

According to one embodiment, the electronic casino game: i) is configured for multiplayer use, ii) monitors a user's brain signal (e.g., generated by brain activity monitoring device 140) and allows a user to attempt to control and change her brain activity to change a game attribute of the electronic casino game, thereby allowing the user to attempt to increase the user's chance of winning the electronic casino game, and iii) provides information for the brain activity of other users who are playing rounds the electronic casino game with the user. For example, the electronic blackjack game may be configured for multiplayer user, and may allow each user to change the user's chances of winning the game by allowing each user to attempt to control the cards dealt to the user as described above with respect to FIG. 2D.

Further, the electronic blackjack game may display information for the brain activity of each user, and may display a summary of the brain activity of each user. Each user may attempt to interoperate the information for the brain activity and the summary of the brain activity of the other users for making decision for further play in a round of the game, such as increasing a bet, being dealt another card, folding a hand, or other game activity.

In one implementation, the electronic blackjack game assigns the users of the electronic blackjack game in series, for example, to be a dealer for one or more rounds of play. The electronic blackjack game may display information for the brain activity and a summary of brain activity of the dealer. The other users playing a round of the electronic blackjack game against the dealer may attempt to interoperate the information for the dealer's brain activity to decide the plays that the users will make in a round of play.

Embodiments of the invention allow user's of the electronic casino game to increase their chances of winning rounds of play of the game. As such, the users may become engaged with the electronic casino game, and play the game for relatively long periods of time trying to win numerous rounds of the games, which may be beneficial to a gambling business offering the electronic casino game. Additional electronic casino games that may be configured to change a game attribute based on brain activity, display information for at least a portion of the brain activity, or both, may include baccarat, craps, sic bo, and the like.

Figure 5:
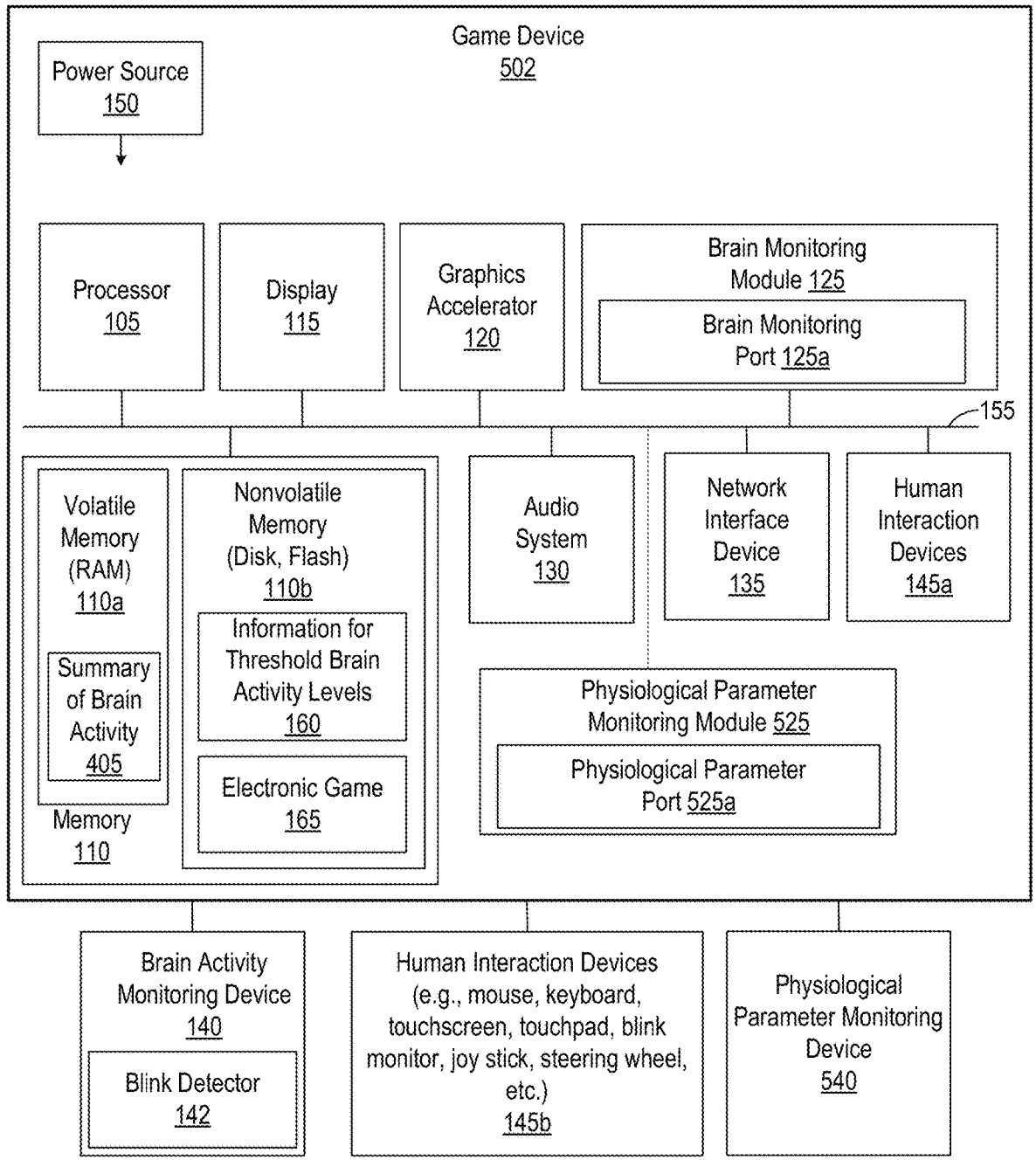
FIG. 5 is an image a game system having a game device and a physiological monitoring device coupled to the game device.

FIG. 5 shows a game system having a game device 502 and a physiological parameter monitoring device 540. Game device 502 includes a physiological parameter monitoring module 525, which includes a physiological parameter port 525a. Game device 502 may include one or more of the electronic modules of game device 102 in any combination. For example, in an implementation game device 502 includes brain-monitoring module 125. In an alternative implementation, game device 502 does not include a brain-monitoring device 125.

In an implementation, game device 502 is adapted to play one or more of a variety of electronic casino games such as roulette, card games (e.g., poker, baccarat, sic bo, or others), slot machine type games, craps, or others. Game device 502 can be adapted to play other games, such as social games. Game device 502 can be adapted to play two or more person games where two or more people play the game in competition against one another (e.g., social gaming, such as Pokemon Go, a strategy game, a casino type game, sports games, or others).

Physiological parameter monitoring device 540 can include one or more of a human interface devices (e.g., a computer mouse, a keyboard, a touchpad, a blink monitor for monitoring whether a user's eye has blinked, a joystick, a steering wheel, or others), a phone (e.g., smartphone), a watch (e.g., smartwatch), a piece of exercise equipment (e.g., treadmill, exercise bicycle, a bicycle part (e.g., a handle bar), a bicycle computer, a cadence monitor, a stroke-rate monitor for swimming, a pedometer, a global positioning system (GPS) device (e.g., physiological measurement information is movement of a user from one location to another location, rate of the movement, or both), a golf cart, a golf club, a bat, a racket, a stepmill machine, a stair climber machine, a rowing machine, an elliptical trainer machine, on a piece of clothing, or others), a fitness monitoring device (e.g., a fitness monitor adapted for wear on the wrist similar to a watch, on the ankle, on the ears, or others, such as a Fitbit fitness monitor), an oximeter (e.g., tissue oximeter or pulse oximeter), or others. The physiological parameter monitoring device includes one or more monitoring elements that monitor one or more physiological parameters of a user. The monitoring elements can include one or more of metallic contacts adapted to contact skin, electromagnetic detectors, current measuring devices, optical sources and optical detectors (e.g., LEDs and photodetectors forming portions of an oximeter), or others for monitoring heart rate, change in heart rate, respiration rate, change in respiration rate, sweat secretion, blood pressure, blood oxygen saturation or other oximetry measures, skin temperature, core body temperature, blood oxygen saturation, or other physiological parameters. The monitoring elements can be included in a part of the device, in an attachment (e.g., wired connector, such as an ear clip) adapted to attach to the device, or both.

In an implementation, device 540 includes an analog-to-digital convertor (ADC) that digitizes measurement data generated by the monitoring elements. In some implementations, the device includes an amplification device (e.g., a transimpedance amplifier) that amplifies, converts current signals to voltage signals, or both. The amplification device is located between the monitoring devices and the ACD. The device 540 can include a transmitter or transceiver that is connected to the ACD and transmits communications with physiological information to the game device and receive instructions from the game device. The communications can be packetized in Ethernet formatted packets, Bluetooth formatted packets, or others. The device 540 can includes a processing unit that performs the packetization. The processing unit can be positioned between the ACD and the transmitter. The processing unit can include a microprocessor, a microcontroller, control logic (e.g., field programmable gate array, programmable logic device, complex programmable logic device), application specific integrated circuits, or others.

The physiological parameter monitoring device can be coupled to the game device by a wired connection, a wireless connection, or combination of wired and wireless connections. The wired or wireless connection can be a direct connection without an intermediary device connected between the physiological parameter monitoring device and the game device. In an implementation, the physiological parameter monitoring device is coupled to the game device by one or more intermediary devices, such as web based devices (e.g., Wi-Fi router, computer, server, the links between these devices, or others).

The physiological parameter port 145a of the game device can be include a receiver or transceiver that is adapted to receive communications from the physiological parameter monitoring device, transmit communications to the physiological parameter monitoring device, or both. In an implementation, the physiological parameter port receives communications from the physiological parameter monitoring device where the communications include physiological information about the user of the physiological parameter monitoring device where the device has measured the physiological parameter.

The physiological parameter monitoring module receives information for the physiological parameter or a number of physiological parameters from the port and compares the received information to one or more threshold levels for determining whether to increase the chance of winning a game being played by the game device, lower the chance of winning, or leaving the chance of winning unchanged. The one or more threshold levels can be different for different types of physiologic parameter monitoring devices. Information transmitted from the physiological parameter monitoring device can include information that identifies the type of device, e.g., information to identify the device as an exercise bicycle, a smartwatch, or others.

For example, for a physiological parameter monitoring device that forms a portion of a piece of exercise equipment, (e.g., an exercise bicycle), the physiological parameter information (e.g., heart rate) generated by the exercise equipment can be compared to a first (e.g., upper) threshold level to determine whether to increase the chance of winning, leave the chance of winning unchanged, or lower the chance of winning. For example, if the physiological parameter information (e.g., heart rate) is at or above the threshold level, then the game device can increase the chance of winning the round of play that is being played by the game device. In an implementation, if the physiological parameter information (e.g., heart rate) is below the threshold level, then the game device leaves the chance of winning unchanged. In another implementation, if the physiological parameter information (e.g., heart rate) is below the threshold level, then the game device lowers the chance of winning.

The threshold level (e.g., for a heart rate) can be set in the exercise range of the user, such that if the user is in their exercise range, then the user receives the benefit of having a chance of winning the game being played increased by the game device. A default mode can be to not lower the chance of winning a game being played if the user's physiological parameter information (e.g., heart rate) is below the threshold level, so that the user is not discouraged from exercising by not receiving a game detriment (e.g., lower chance of winning). An advanced mode of game play (e.g., non-default, user selectable) of a round of play for an advanced user may be to lower the chance of winning the round of play being played by the game device when the advanced mode is selected by the user. A user might choose the advanced mode of play to challenge themselves, such as riding an exercise bicycle with a high heart rate (e.g., for an extended period of time).

In an implementation, two threshold levels are used by the physiological parameter monitoring module 525 to determine whether to increase, keep constant, or lower the chance of winning the game being played. A first of the two threshold levels is higher than a second of the two threshold levels. For example, if the physiological parameter information (e.g., heart rate) is at or above the first threshold level, then the game device can increase the chance of winning the round of play that is being played by the game device. If the physiological parameter information (e.g., heart rate) is below the first threshold level and above the second threshold level, then the game device leaves the chance of winning unchanged. If the physiological parameter information (e.g., heart rate) is at or below the second threshold level, then the game device lowers the chance of winning. More threshold levels can be used by the game device to provide gradations of increased chances to win and gradations of decreased changes to win the round of play of the game being played. While the above described example implementation uses heart rate information by the game device, the physiological parameter information can be other physiological parameters, such as amount of sweat determined by a conductivity measurement across the surface of the skin, a moistures measurement on the surface of the skin, the temperature, or others.

The game being played by game device 502 can be any of the electronic casino games described above or other games, such as social networking games provided on a variety of platforms, such as Facebook, Inc. of Menlo Park, Calif., or applications operating on the game device.

The game can be a sports game. For example, the game being played on the game device can be a bicycle racing game where a user of the game device is riding a bicycle or exercise bicycle and races other "riders" (e.g., computer generated riders who are not human riders) provided in the game environment. The increased chance of winning is a speed bonus, time bonus (e.g., the user has to ride a shorter distance than the other riders in the game), position bonus (e.g., the user is moved forward in the race whereas the other riders are not moved forward in the game), or other bonus is provided to the user by the game where bonus is not provided to the other riders. A decrease in the chance of winning can be a speed detriment (e.g., the user's speed is lowered in the game or the other rider's speeds are increased), a time detriment (e.g., the user has to ride a longer distance to complete the race, a position detriment (e.g., the user is moved back in the race), or other detriments.

The game being played by the game device can be operated on a number of game devices at the same time where a number of users of their own game units can play the game in a competitive head-to-head mode, or a number of users can play the game operated on the game device in a competitive head-to-head mode. In a competitive head-to-head mode where multiple users play a game operated on a single game device, the game device can be connected (e.g., wired or wirelessly) to the physiological parameter monitoring devices of each of the players. The use environment can be a gym where multiple uses ride exercise bicycles and watch a large screen TV where video for the game being played by the game device is displayed or where each exercise bicycle has a display that displays the game being played by the game device.

The physiological parameters (e.g., heart rates) of the multiple users playing the game are compared by the game device to determine whether a user is awarded an increased chance of winning the game. That is, a user having a highest heart rate or a user having a heart rate maintained within a predetermined range for a longest period of time (e.g., compared to other users) is awarded an increased chance of winning the game by the game device, which makes the comparisons of the physiological parameters transmitted to the game device by the user's physiological parameter monitoring devices.

In an implementation, the game machine provides an increased chance of winning the round of a game being played by the game device if the physiological parameters (e.g., heart rates) of the users are above threshold level as described above, where any user having a physiological parameter (e.g., heart rate) above the threshold levels receives the increased change of winning the round of play. In an further implementation, an increased chance of winning the round of a game being played is awarded to a user if the user's physiological parameter (e.g., heart rate) is at or above a threshold level and the user's physiological parameter is greater than other users playing the game.

In an implementation, an increased change of winning a round of play of the game being played by the game device is awarded if an accumulated physiological parameter (e.g., distance bicycled, distance walked, distance run, heart rate above a threshold level for a period of time, or others) is achieved by the user where the user's physiological parameter monitoring device determines the accumulated physiological parameter or the game device determines the accumulated physiological parameter from physiological information transmitted to the game device from the user's physiological parameter monitoring device. For example, for a round of play of a slot machine game being played by the game device while the user exercises (e.g., walks), the game device will increase the chance of winning the round of play of the game being played when the user has an accumulated physiological parameter (e.g., distance walked) that is above a threshold level (e.g., predetermined distance, such as one kilometer, two kilometers, or other distance). In an implementation, the chance of winning a round of play can be increased multiple times when an accumulated physiological parameter surpasses respective multiple threshold levels. For example, a chance of winning the round of play can be increased to a first chance of winning that is greater than a base chance of winning, when a user's accumulated physiological parameter has surpassed a first threshold level, and the chance of winning the round of play can be increased to a second chance of winning, when a user's accumulated physiological parameter has surpassed a second threshold level, where the second chance of winning the round of play is greater than the first chance of winning. Further increases in the chance of winning a round of play can be awarded when a user's accumulated physiological parameter has surpassed higher threshold levels.

In an implementations, two or more physiological parameters are collected by the game device from the user's physiological parameter monitoring device and used by the game device to determine whether an increased chance of winning a round of play of a game being played will be increased. For example, a user having a first physiological parameter (e.g., heart rate) and a second physiological parameter (e.g., brain waves) both above respective threshold levels, then the chance of winning the round of play is increased by the game machine.

In an implementation, the physiological parameter monitoring device, the brain activity monitoring device, one of these devices, or both of these devices is located in a headset. Detectors for the physiological parameter monitoring device, the brain activity monitoring device, or both can be located in the temples of the headset, in an ear clip of the headset, in a top portion of the headset that is adapted to extend across a user's pate or other head portions.

The headset can be a virtual reality headset, an augmented reality headset, a mixed reality headset, a combination of one or more of these headset types, or others. The headset can include the game device integrated into the headset or can be connected to the game device via a wired or wireless connection. Visual information for the game being played is displayed on the display of the headset, such as the visual information for the electronic casino games described above or the visual information for the sports games described above (e.g., bike race).

Figure 6:
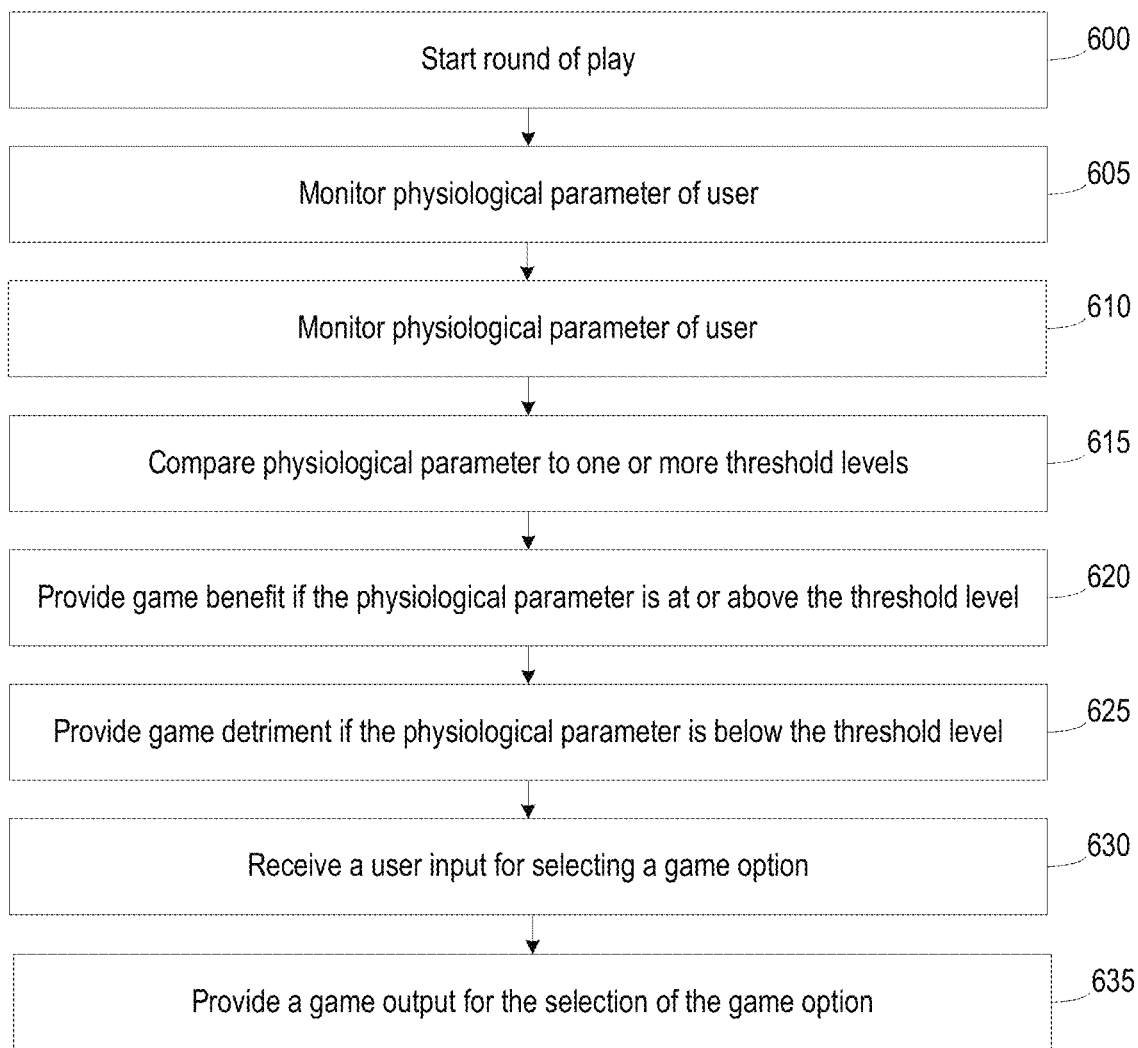
FIG. 6 is a high-level flow diagram of a method of play of an electronic game, such as an electronic casino game, according to one embodiment.

FIG. 6 is a high-level flow diagram of a method of play of an electronic game, such as an electronic casino game, according to one embodiment. The high-level flow diagram represents one example embodiment. Steps may be added to, removed from, or combined in the high-level flow diagram without deviating from the scope of the embodiment.

At 600, a round of play of the electronic game (e.g., electronic casino game, bicycle race game, or others) is started, for example, via a user input received by game device 502. The user input may be received by the game device from brain activity monitoring device 140, by one of human interface devices 140*a* or 140*b*, by physiological parameter monitoring device 540, or by other input device. At 605 physiological parameter monitoring device 540 monitors one or more physiological parameters of a user and generates a physiological parameter signal based (e.g., an electrical signal which may be digitized by the ADC) on the detected physiological parameter. The physiological parameter monitoring device transmits the physiological parameter signal to the game device via a transmitter or transceiver at 610.

The game device (e.g., the physiological parameter monitoring module 525, playing a round of play of an electronic game), during a temporal period when the round of play is being played, compares the physiological parameter information (e.g., values or intensity levels of the information) in the physiological parameter signal to a threshold level of a physiological parameter to determine whether the physiological parameter information is at or above the threshold level, is below the threshold level, or both (step 615). For a multiplayer game where multiple users are using the game device, the physiological parameter signals of multiple users may be compared to one or more threshold levels to determine whether one or more of the physiological parameter signal is above, at, or below the threshold level.

The one or more threshold levels of physiological parameters are predetermined and are stored in the memory of the game device for use by the game device during a round of play of a game operated by the game machine. In an implementation, one or more of the threshold levers are user programmable and are stored in the memory of the game device for use by the game device during a round of play of a game operated by the game machine. The user programmable threshold levels can be stored in the memory prior to a round of the game being played or during the temporal period when the round of play of the game is being played.

At 620, the game device provides a game benefit if the physiological parameter information is at or above the threshold level. That is, the game device changes a game attribute to increase the user's chance of winning the round of play that is currently being played. The game device may provide a user output that indicates the change to the game attribute (i.e., decreasing the rotation rate of slot wheels where the rotation rate may be detected by the user) so that the user can monitor and control of the game attribute by controlling and changing her physiological parameter (e.g., heart rate). The game device may also display a value for the increased chance of winning, such as a percentage value for the increased chance of winning.

In an implementation, the changed game attribute is displayed on the display by the game device. The changed game attribute can be displayed on the display without user input being received from the user by the game device. For example, for a sports game, such as a bicycle race game, an increased speed or other increased chance of winning is displayed without a user input for selecting a game option or attribute.

In one implementation, at 625, the game device may provide a game detriment or leave the chance of winning the game unchanged if the game device determines that the physiological parameter information is below the threshold level.

In one implementation, the game detriment is displayed on the display by the game device. The changed game attribute (e.g., detriment) can be displayed on the display without user input being received from the user by the game device. For example, for a sports game, such as a bicycle race game, a decreased speed or other decreased chance of winning is displayed without a user input for selecting a game option or attribute.

In one implementation, at 630, the game device receives a user input from the user for selecting a game option based on the game attribute. The game option may be for stopping the round of play (e.g., stop all of the slot wheels) based on the game attribute (e.g., slowed slot wheels). Alternatively, the game option (stopping one slot wheel) might be included in a set of game options where other game options included in the set of game options may be selected by the user at a later time (e.g., stopping other rotating slot wheels at a later time).

In one implementation, at 635, the game device provides a user output that indicates the user's selection of the game option (e.g., display the stopping or one or more of the slot wheels on display 115). Thereafter, if the round of the game is still being played (e.g., the other slot wheels are still rotating), then steps 605-635 may be repeated until the round of play has stopped.

According to an alternative implementation, at step 615 where the game device is a multiplayer game and multiple users might be using the game device, then the physiological parameter signal of the multiple users may be received from the users' respective physiological parameter monitoring devices 540 and may be compared (e.g., by the game device's physiological parameter monitoring module 525) to one or more threshold levels by the game device. Then at step 620 or 625 game benefits or detriments might be applied to various ones of the users if the user's physiological parameter signals are above, at, or below the threshold level as described above.

Each of the steps of the method can be executed during a temporal period when the round of play is being played by the game device. In an implementation, accumulated physiological parameters are accumulated asynchronously with game play and are provided to the game machine before the temporal period when the game is being played or during the temporal period when the game is being played. In another implementation, accumulated physiological parameters are accumulated synchronously with game play and are provided to the game machine during the temporal period when the game is being played.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. Elements of the variously described implementations and embodiments can be included in other described implementations and embodiments in any combination. The scope of the invention is defined by the following claims.

The invention claimed is:

1. A system comprising:
an electronic game machine comprising:
a headset;
a processor, housed by the headset, capable of electrically coupling to a first physiological parameter monitoring device;
a display, coupled to the processor and to the headset;
a computer-readable storage medium, housed by the headset, coupled to the processor, comprising instructions for controlling the processor to be capable of:
receiving electrical signals for a physiological parameter transmitted from the first physiological parameter monitoring device when a round of play of a game is being played by the electronic game machine,
calculating a value of the physiological parameter using the electrical signals received from the first physiological parameter monitoring device when the round of play is being played by the electronic game machine, and
changing a chance of winning the round of play being played from a first chance of winning to a second chance of winning, when the round of play is being played by the electronic game machine, if the value of the physiological parameter detected by the first physiological parameter monitoring device is greater than a threshold level of the physiological parameter, wherein the threshold level of the physiological parameter is previously determined and information for the threshold level of the physiological parameter is stored in the computer-readable storage medium, and the second chance of winning is different from the first chance of winning.

2. The system of claim 1 wherein the computer-readable storage medium comprises instructions for controlling the processor to be capable of starting the round of play of the game operated by the electronic game machine.

3. The system of claim 1 wherein the computer-readable storage medium comprises instructions for controlling the processor for maintaining the chance of winning at the first chance of winning, during the temporal period when the round of play is being played by the electronic game machine, if the value of the physiological parameter calculated by the processor is less than the threshold level of the physiological parameter.

4. The system of claim 1 wherein the instructions for controlling the processor for changing the chance of winning the round of play include instructions for controlling the processor for increasing the first chance of winning the round of play to the second chance of winning the round of play, wherein the second chance of winning the round of play is greater than the first chance of winning the round of play.

5. The system of claim 4 wherein the computer-readable storage medium comprises instructions for controlling the processor to be capable of, during the temporal period when the round of play is being played by the electronic game machine, lowering the first chance of winning the round of play to a third chance of winning the round of play if the value of the physiological parameter is below a second threshold level, wherein the second threshold level is previously determined and information for the second threshold level is stored in the computer-readable storage medium, the third chance of winning the round of play is less than the first chance of winning the round of play, and the second threshold level is less than the first threshold level.

6. The system of claim 1 wherein changing the chance of winning includes changing a game attribute of the electronic game machine.

7. The system of claim 1 wherein the electronic game machine comprises the first physiological parameter monitoring device and the headset houses the first physiological parameter monitoring device.

8. The system of claim 1 wherein the electronic game machine comprises a second physiological parameter monitoring device and the headset houses the second physiological parameter monitoring device.

9. The system of claim 8 wherein the first physiological parameter monitoring device is a heart rate monitor.

10. The system of claim 9 wherein the second physiological parameter monitoring device is a brain wave monitoring device.

11. The system of claim 1 wherein the display is adapted to display images for a casino game.

12. The system of claim 1 wherein the physiological parameter monitoring device is capable of electrically coupling to a user of the electronic game machine to detect the physiological parameter.

13. A system comprising:
an electronic game machine comprising:
a headset;
a processor, housed by the headset, capable of electrically coupling to a physiological parameter monitoring device; and
a display, coupled to the headset, wherein the display is electrically coupled to the processor;
a computer-readable storage medium, housed by the headset, wherein the computer-readable storage medium is coupled to the processor and comprises instructions for controlling the processor to be capable of:
playing a round of play of a game operated by the electronic game machine, and the physiological parameter monitoring device is capable of:
coupling to a user of the electronic game machine and electrically coupling with the processor that is housed in the headset;
during a temporal period when the round of play is being played by the electronic game machine, detecting a physiological parameter from a body of the user when the body of the user is coupled to the physiological parameter monitoring device;
during the temporal period when the round of play is being played by the electronic game machine, transforming the physiological parameter of the user and detected by the physiological parameter monitoring device into electrical signals that represent the physiological parameter; and
during the temporal period when the round of play is being played by the electronic game machine, transferring the electrical signals for the physiological parameter from the physiological parameter monitoring device to the processor for use of the electrical signals for the physiological parameter outside of the physiological parameter monitoring device by the processor;
during the temporal period when the round of play is being played by the electronic game machine, receiving the electrical signals for the detected physiological parameter transmitted by the physiological parameter monitoring device;
during the temporal period when the round of play is being played by the electronic game machine, calculating a value of the physiological parameter detected by the physiological parameter monitoring device using the electrical signals that are representations of the physiological parameter of the user; and
during the temporal period when the round of play is being played by the electronic game machine, changing a chance of winning the round of play being played from a first chance of winning to a second chance of winning if the value of the physiological parameter detected by the physiological parameter monitoring device is greater than a threshold level of a physiological parameter, wherein the threshold level is previously determined and information for the threshold level is stored in the computer-readable storage medium, and the second chance of winning is different from the first chance of winning.

14. The system of claim 13 wherein the computer-readable storage medium comprises instructions for controlling the processor to be capable of starting the round of play of the game operated by the electronic game machine.

15. The system of claim 13 wherein the computer-readable storage medium comprises instructions for controlling the processor to be capable of maintaining the chance of winning at the first chance of winning, if the value of the physiological parameter detected by the physiological parameter monitoring device is less than the threshold level of the physiological parameter of the body of the user.

16. The system of claim 13 wherein the instructions for controlling the processor for changing the chance of winning the round of play include instructions for controlling the processor for increasing the first chance of winning the round of play to the second chance of winning the round of play, wherein the second chance of winning the round of play is greater than the first chance of winning the round of play.

17. A system comprising:
an electronic game machine comprising:
a headset;
a processor housed in the headset; and
a display, coupled to the headset, wherein the display is electrically coupled to the processor;
a physiological parameter monitoring device, coupled to the headset, wherein the physiological parameter monitoring device is electrically coupled to the processor;
a computer-readable storage medium, coupled to the processor, comprising instructions for controlling the processor to be adapted for:
starting a round of play of a game operated by the electronic game machine, wherein the physiological parameter monitoring device is adapted for:

coupling to a user of the electronic game machine;

during a temporal period when the round of play is being played by the electronic game machine, detecting a physiological parameter of a body of the user when the user is connected to the physiological parameter monitoring device;

during the temporal period when the round of play is being played by the electronic game machine, transforming the physiological parameter of the body of the user and detected by the physiological parameter monitoring device into electrical signals that represent the physiological parameter; and during the temporal period when the round of play is being played by the electronic game machine, transferring the electrical signals for the physiological parameter from the physiological parameter monitoring device to the processor for use of the electrical signals for the physiological parameter outside of the physiological parameter monitoring device by the processor;

during the temporal period when the round of play is being played by the electronic game machine, receiving the electrical signals for the physiological parameter transmitted by the physiological parameter monitoring device;

during the temporal period when the round of play is being played by the electronic game machine, calculating a value of the physiological parameter detected by the physiological parameter monitoring device using the electrical signals that are representations of the physiological parameter of the body of the user;

during the temporal period when the round of play is being played by the electronic game machine, changing a chance of winning the round of play being played from a first chance of winning to a second chance of winning if the value of the physiological parameter detected by the physiological parameter monitoring device is greater than a threshold level of a physiological parameter, wherein the threshold level is previously determined and information for the threshold level is stored in the computer-readable storage medium, and the second chance of winning is different from the first chance of winning; and during the temporal period when the round of play is being played by the electronic game machine, maintaining the chance of winning at the first chance of winning, if the value of the physiological parameter detected by the physiological parameter monitoring device is less than the threshold level of the physiological parameter of the body of the user.

18. The system of claim 17 wherein the instructions for controlling the processor for changing the chance of winning the round of play include instructions for controlling the processor for increasing the first chance of winning the round of play to the second chance of winning the round of play, wherein the second chance of winning the round of play is greater than the first chance of winning the round of play.

19. The system of claim 17 wherein the physiological parameter monitoring device is a brain wave monitoring device, the physiological parameter is a brain wave, the value of the physiological parameter is an intensity of the brain wave, and the threshold level of a physiological parameter is a threshold level of an intensity of the brain wave.

20. The system of claim 17 wherein the physiological parameter monitoring device comprises a tissue oximeter.

* * * * *